United States Patent
Dullage

(10) Patent No.: US 12,018,562 B2
(45) Date of Patent: Jun. 25, 2024

(54) WELLBORE COMMUNICATION METHODS AND SYSTEMS

(71) Applicant: Expro North Sea Limited, Aberdeen (GB)

(72) Inventor: Bryan Dullage, Ferndown (GB)

(73) Assignee: Expro North Sea Limited, Dyce (GB)

( * ) Notice: Subject to any disclaimer, the term of this patent is extended or adjusted under 35 U.S.C. 154(b) by 198 days.

(21) Appl. No.: 17/430,370

(22) PCT Filed: Feb. 12, 2020

(86) PCT No.: PCT/GB2020/050326
§ 371 (c)(1),
(2) Date: Aug. 12, 2021

(87) PCT Pub. No.: WO2020/165584
PCT Pub. Date: Aug. 20, 2020

(65) Prior Publication Data
US 2022/0127955 A1    Apr. 28, 2022

(30) Foreign Application Priority Data
Feb. 12, 2019 (GB) ...................... 1901925

(51) Int. Cl.
*E21B 47/12* (2012.01)
*E21B 41/00* (2006.01)
*H04B 3/04* (2006.01)
*H04B 3/54* (2006.01)

(52) U.S. Cl.
CPC ............. *E21B 47/12* (2013.01); *E21B 41/00* (2013.01); *H04B 3/04* (2013.01); *H04B 3/54* (2013.01); *H04B 2203/5475* (2013.01)

(58) Field of Classification Search
CPC ........ E21B 41/00; E21B 47/12; E21B 47/125; E21B 47/13; E21B 47/14; E21B 47/16; H04B 3/04; H04B 3/54; H04B 2203/5475
See application file for complete search history.

(56) References Cited

U.S. PATENT DOCUMENTS

| | | | |
|---|---|---|---|
| 4,001,773 A * | 1/1977 | Lamel ..................... | E21B 47/16 175/40 |
| 6,556,144 B1 * | 4/2003 | Roberts .................. | H04B 13/02 340/855.8 |
| 6,587,037 B1 | 7/2003 | Besser | |
| 7,798,214 B2 * | 9/2010 | Schmitt ................. | E21B 47/125 175/50 |
| 8,329,004 B2 * | 12/2012 | Georgia .................. | C23F 13/16 204/196.36 |
| 2013/0081955 A1 | 4/2013 | Al-Mubasher | |
| 2015/0022371 A1 | 1/2015 | Shanks | |

FOREIGN PATENT DOCUMENTS

GB    2352150 B    3/2004

* cited by examiner

*Primary Examiner* — Franklin D Balseca
(74) *Attorney, Agent, or Firm* — Getz Balich LLC

(57) ABSTRACT

A method and system of opportunistic communication in a well structure are provided. The method includes identifying at a first location an existing signal propagating in a section of the well structure between the first location and a second location; modifying that existing signal so as to encode information at the first location for opportunistic communication of that information to the second location; and receiving the modified signal at the second location and decoding the signal so as to retrieve the information.

18 Claims, 2 Drawing Sheets

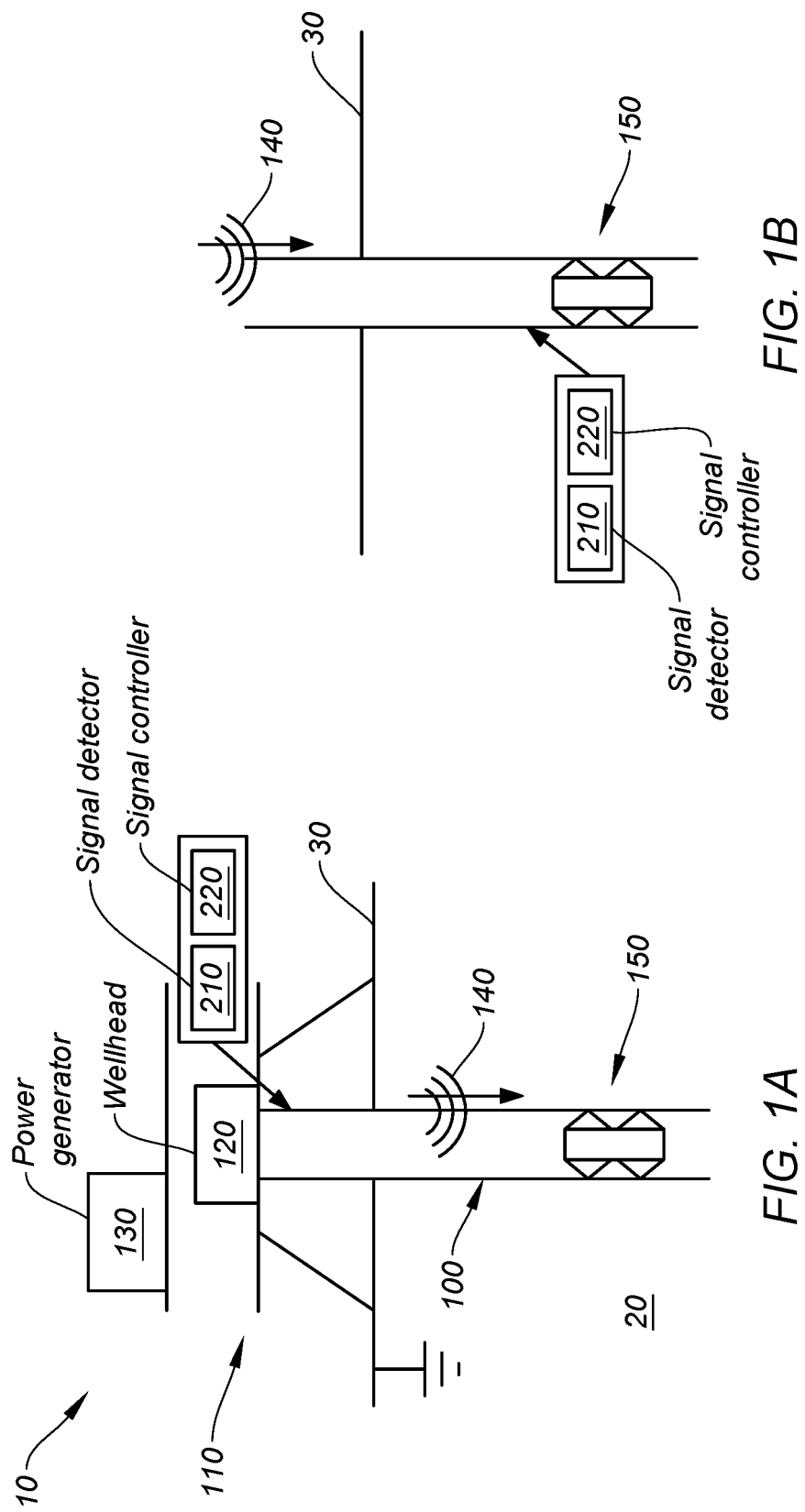

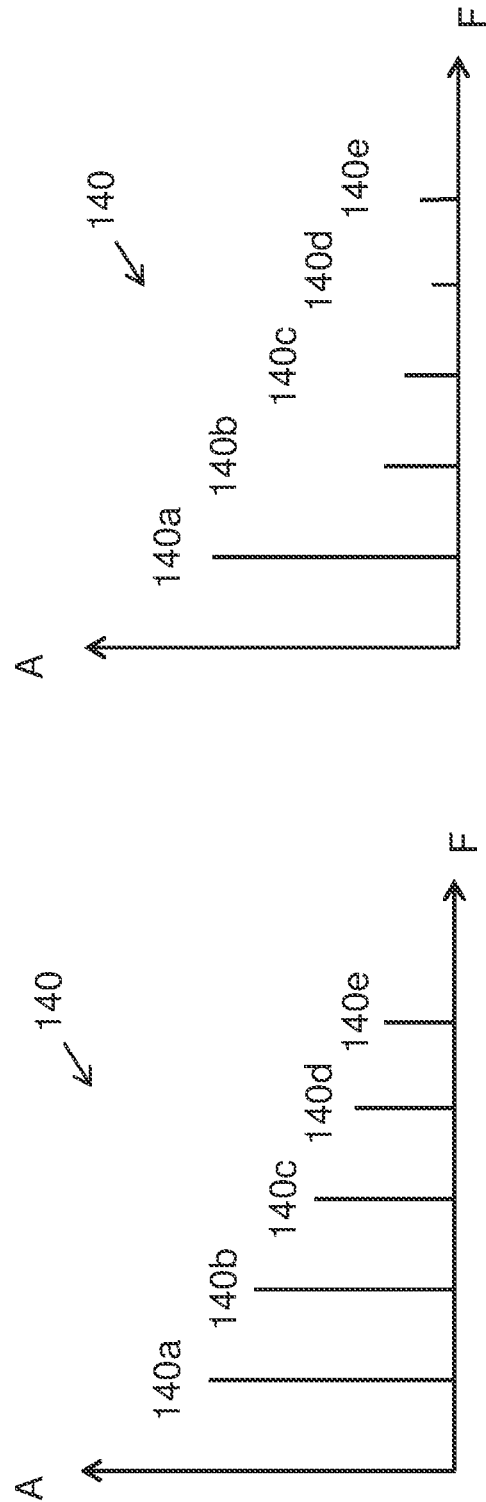

WELLBORE COMMUNICATION METHODS AND SYSTEMS

This application claims priority to PCT Patent Appln. No. PCT/GB2020/050326 filed Feb. 12, 2020, which claims priority GB Patent Appln. No. 1901925.6 filed Feb. 12, 2019, which are herein incorporated by reference.

BACKGROUND OF THE INVENTION

1. Technical Field

Some described examples relate to systems and methods for communicating in a well structure, and in particular opportunistic communication in such well structures.

2. Background Information

A typical oil and gas well infrastructure may comprise different communications systems and devices in order to communicate data to and from the well (e.g. from surface), as well as to provide power and/or control signals to devices or tools within the well. Such communications systems may use different (or hybrid) signal species such as fluid pulses, electromagnetics, acoustics, etc.

There is a continuing need to improve the manner in which signals are communicated in a well structure, for example, so as to improve transmission reliability, or to minimize power consumption. Power consumption and efficiency of communication can be an important consideration when installing specific communication systems. In many cases, downhole power is provided by batteries, which have a variable lifespan depending on power usage and conditions downhole. To control costs and downtime, it can be helpful to ensure that such communication systems run as efficiently as possible.

This background serves only to set a scene to allow a skilled reader to better appreciate the following description. Therefore, none of the above discussion should necessarily be taken as an acknowledgement that that discussion is part of the state of the art or is common general knowledge.

SUMMARY OF THE INVENTION

In some examples, there are provided methods and systems that improve the manner in which signals are communicated in well structures, for example, so as to improve transmission reliability, to minimize power consumption, etc.

Some examples describe methods of communication in a well structure, and in particular methods of opportunistic communication.

The method may comprise identifying at a first location an existing signal propagating in a section of the well structure between the first location and a second location. The method may comprise modifying that existing signal, e.g. so as to encode information, at the first location for communication, such as opportunistic communication, of that information to the second location. The method may comprise receiving a modified signal at the second location. Further, the method may comprise decoding the signal so as to retrieve the information.

In some examples, the existing signal is a noise signal. Such a noise signal may be generated in the well structure. Examples of such noise signals being generated may be from an electric power source, which may be located at or near the well structure. In those examples, the electric power source may comprise a power generator for supplying electric power at the well structure. Such noise signals may comprise characteristics associated with power generation.

Such an electric power source may comprise a rectifier device for rectifying electrical power at the well structure. Such a rectifier device may be configured to rectify electric power for application or use of DC current at the well structure. The rectifier device may be configured to provide Impressed Current Cathodic Protection (ICCP) at the well structure, for example.

In some cases, the noise signal may comprise a series of harmonics. The step of modifying the existing signal may include modifying the harmonics characteristics of that signal so as to encode information. The step of identifying an existing signal propagating in a section of the well structure may include identifying one or more particular harmonics of that signal for preferential modification and communication of that signal.

In some examples, the step of modifying may include changing the characteristics of a signal path for the existing signal in the well structure. For example, changing the characteristics may include changing the impedance of the signal path. Further, the step of modifying the existing signal may comprise selectively varying, e.g. over time, the impedance of the signal path.

The modified signal received at the second location may be used additionally to provide power to a device at that location. In some examples, the method may be considered to provide opportunistic communication. Such opportunistic communication of information may be used to control a downhole device.

There is further described a method of opportunistic communication in a well structure, the method comprising: identifying at a first location an existing signal propagating in a section of the well structure between the first location and a second location; modifying that existing signal so as to encode information at the first location for opportunistic communication of that information to the second location; receiving the modified signal at the second location, and decoding the signal so as to retrieve the information.

Further, there is described a system for communication, such an opportunistic communication, in a well structure. As mentioned above, the system may improve the manner in which signals are communicated in well structures, for example, so as to improve transmission reliability, to minimize power consumption, etc.

In some examples, the system may comprise a signal detector, e.g. configured to identify at a first location an existing signal propagating in a section of a well structure between that first location and a second location. The system may comprise a signal controller, e.g. configured, in response to the signal detector identifying an existing signal, to modify that existing signal so as to encode information at that first location for opportunistic communication of that information to a second location in that well structure. Such a modified signal may be for receipt and decoding at that second location so as to retrieve the information.

The system may comprise a signal receiver, e.g. for provision at a second location at a well structure. Such a signal receiver may be configured to receive a modified signal and decode that signal for retrieval of information.

The signal receiver may be configured for use with a downhole device. In such examples, receipt of a signal at the signal receiver may be useable to control that downhole device.

The signal detector may be configured to detect, as the existing signal, a noise signal generated in a well structure from an electrical power source, e.g. a power source located at or near the well structure. The signal detector may be configured to detect a series of harmonics in a noise signal. In some examples, the controller may be configured to modify such an existing signal so as to modify the harmonics of that signal and encode information. The system may be configured to change the characteristics of a signal path for an existing signal in a well structure.

There is further described a system for opportunistic communication in a well structure, the system comprising: a signal detector configured to identify at a first location an existing signal propagating in a section of a well structure between that first location and a second location; a signal controller configured, in response to the signal detector identifying an existing signal, to modify that existing signal so as to encode information at that first location for opportunistic communication of that information to a second location in that well structure, such a modified signal for receipt and decoding at that second location so as to retrieve the information.

There is further described a method of opportunistic communication of power in a well structure.

The method may comprise identifying at a first location an existing signal propagating in a section of the well structure between the first location and a second location. The method may further comprise receiving the signal at the second location, and using power in the signal at that second location or further location in the well.

The method may comprise modifying the identified existing signal to as to improve signal transmission of power to the second location.

There is also described a method of opportunistic communication of power in a well structure, the method comprising: identifying at a first location an existing signal propagating in a section of the well structure between the first location and a second location; receiving the signal at the second location, and using power in the signal at that second location.

In some examples, there is provided a computer program product or computer file configured to at least partially (or fully) implement the systems, devices and methods as described above.

In some examples, there is also provided a carrier medium comprising or encoding the computer program product or computer file. In some examples, there is also provided processing apparatus when programmed with the computer program product described. Some of the above examples may implement certain functionality by use of software, but that functionality could equally be implemented mainly or solely in hardware (for example by means of one or more ASICs (application specific integrated circuit) or Field Programmable Gate Arrays (FPGAs)), or indeed by a mix of hardware and software (e.g. firmware). As such, the scope of the disclosures should not be interpreted as being limited only to being implemented in software or hardware.

Aspects of the inventions described may include one or more examples, embodiments or features in isolation or in various combinations whether or not specifically stated (including claimed) in that combination or in isolation. It will be appreciated that one or more embodiments/examples may be useful with power and/or signal communication in a well structure.

BRIEF DESCRIPTION OF THE DRAWINGS

A description is now given, by way of example only, with reference to the accompanying drawings, in which:—

FIGS. 1A and 1B show simplified representations of well infrastructure; and

FIGS. 2A and 2B show examples of signals having frequency components.

DETAILED DESCRIPTION OF THE INVENTION

Some of the following examples have been described specifically in relation to well infrastructure relating to oil and gas production, or the like, but of course the systems and methods may be used with other well structures. Similarly, while in the following example an offshore well structure is described, nevertheless the same systems and methods may be used onshore, as will be appreciated.

FIG. 1 shows an example of a well installation 10 according to a described example. Simply for ease of representation, the well installation 10 comprises a metallic well structure 100 that extends from a subterranean formation 20 via a seabed 30 to a platform 110, and a dry wellhead 120. It will be appreciated that in other examples of installations 10, the wellhead 120 or other infrastructure may be positioned at the seabed 30 or on land, as is known. Here, a downhole device 150 is deployed in the well structure 100, and is shown in this example as a wireless device 150. In this specific example the device 150 is in electrical communication with the metallic well structure 100 so as to be able to receive signals from that well structure, as will be further described. It will be appreciated given the following description that the device 150 may comprise a gauge, valve, or any such downhole device or tool used in the well structure 100.

Typically, during oil and gas operations, electric power is required at the well installation 10 in order to operate systems and subsystems, etc. In some examples, the power requirements at the well installation 10 may be satisfied by supply for an existing power network. Otherwise, where the installation 10 is isolated from a power network then power may need to be generated at that installation 10. In this example, a power generator 130 is provided at the installation 10, which provides electric power as an output. Typically, an AC power generator is provided by a genset, or the like, outputting 3-Φ power. Of course, in other circumstances, single phase may be provided. Further, in some examples, the power output may then be fully or partially rectified in order to provide DC requirements at the installation 10, e.g. when providing impressed cathodic current protection to the well structure 100.

In any event, when providing a load from the AC power generator 130 or indeed when loading a rectified power output from that generator 130, the power quality is typically affected by that load to the extent that frequency components or artefacts (e.g. harmonics) are evident in the power output and, in particular, in any associated ground signal. In other words, frequency components associated with power supply at the well installation may be apparent and detectable in a ground signal, propagating to earth. Typically those frequency components are factors of the rotating frequency of the genset, e.g. 50 Hz or 60 Hz, as appropriate. In that case, the frequency components may comprise one or more harmonics (e.g. 150/180 Hz, etc.).

It is common in power networks to try to mitigate, as much as possible, the presence of such harmonics as they can voltage distortion, essentially providing noisy signals in the power supply, and lead to power system inefficiency and losses.

However, when such harmonics are evident, these will typically be apparent on any ground signal as mentioned above. In the case of power generator 130 provided at a well installation 10, a ground or otherwise power noise signal 140 may be communicated to earth via the well structure 100, as is shown in FIG. 1. Here, the signal path to ground will be affected by the effective grounding, and essentially the impedance of that grounding, at the well structure 100. In many cases, that signal 140 will be evident some way down into the formation, along the length of the metallic well structure 100.

During steady operating conditions and depending on the load characteristics at the well installation 100 the signal 140 will likely comprise consistent frequency components, and in this example harmonics 140a-140e, which may be communicated to earth via the metallic well structure 100. FIG. 2 shows simplified example of a signal 400 having multiple frequency components 140a-140e. Here, the signal 140 comprises a principal signal 140a and multiple harmonic components 140b-140e. Of course, it will be appreciated that each of the components 140a-140e will likely have a particular frequency spread, but that is not shown here for ease. Here, each harmonic of the signal 140 has a particular amplitude, as is shown. This complex signal 140 may be apparent at the downhole device 150. During those steady state conditions, the characteristics of the signal 140, and in particular the amplitude of the frequency components 140a-140e observed at the device 150 may also be largely steady state.

Consider now again FIG. 1, which shows a signal detector 210 and signal controller 220 in communication with the well structure 100. Here, the detector 210 and controller 220 form part of a system for communication in the well structure 100, and in particular system for opportunistic communication of signal in the well structure 100. Here, and simply by way of an example, the detector 210 and controller 220 are provided at a first location, which is close to the wellhead 120, and are in electrical communication with the well structure. However, in further examples, the detector 210 and controller 220 may be positioned a first location further down into the well, past the wellhead 120, as will be appreciated. While the detector/controller 210/220 may be considered to be provided at a first location, correspondingly the downhole device 150 may be considered in this example to be provided at a second location, e.g. in the well structure 100, and displaced from the first location (e.g. at the position of a subsurface safety valve, or the like). As mentioned above, the downhole device here is in electrical communication with the well structure 100. Examples of such devices may be provided by Expro Group (e.g. FlowCAT™, CaTS™, etc.), and may use wireless signals communicated to/from the well structure 100.

In this example, the signal detector 210 is configured to identify at that first location an existing signal 140 propagating in a section of a well structure, e.g. from that first location to the second location. Here, the signal detector 210 is configured to analyze the signal 140 in order to determine the nature of the signal 140, and in particular any associated frequency components 140a-140e. As mentioned above, the downhole device 150 is additionally configured to receive signals, which in this case are received at the second location. Similarly, the downhole device 150 is configured to determine receipt of a signal 140, and in this example, any frequency components 140a-140e of that signal 140.

In use, the signal controller 220 is configured, in response to the signal detector 210 identifying a signal 140, to modify that existing signal so as to encode information at that first location for opportunistic communication of that information to the second location in the well structure 100. In order to modify the signal, the signal controller 220 may wish to modulate the signal 140 in some manner.

It will be appreciated that the signal 140 may be modulated in a variety of different ways in order to encode information. However, one exemplary method of modulating the signal 140, as described here, includes altering the effective impedance of the signal path to ground. In some examples, this may include selectively loading or unloading, in an electrical manner, the well structure 100. In doing so, some or all of the frequency component 140a-140e characteristics of the signal 140 may be modified. FIG. 2B shows an example of the signal 140 of FIG. 2A in which the frequency components 140a-140e have been modified using the controller 220. In this case, the amplitude of some of the harmonics components 140b-140e have been reduced.

In use, the system may identify a signal 140 being communicated in the well structure, e.g. an existing signal. Subsequently, the signal may be modified in order to encode information. The relative variation of the signal characteristics of a received signal at the second location, e.g. by the downhole device, may be used to opportunistically receive information from that first location. Such information may include control signals or the like in order to operate the downhole device 150. For example, in some cases, the downhole device may be configured to identify a predefined pattern or modulation in order to control that downhole device 150. In some example, the control signal may be used to open/close a valve, or the like.

While in some examples, modification of the relative amplitudes of the frequency components 140a-140e may be used in order to encode information at the first location, it will readily be appreciated that in further examples additional or alternative modulation schemes may be used in order to encode information.

For example, in some circumstances, time-division modification may be employed whereby the variation of the signal 140 received over particular time intervals is utilized (e.g. over a quantized time frame). It will also be appreciated that while in the above example, a modification of some of the frequency components 140a-140e was effected by the controller 220, in other examples, the system may select one or more particular frequency components (e.g. with the greatest amplitude(s), or transmission capability based on the signal channel) in order to be modified. In other words, the system may select a particular frequency component 140a-140e for optimum transmission, and modify that particular frequency component in order to better transmit encoded information to a second location.

Similar, while FIGS. 2A and 2B show simplified representations of the amplitude of each of the frequency components 140a-140e, the system and methods may nevertheless additionally or alternatively use the a modification of the frequency spread of the signal 140, as will be appreciated.

Further, while in the example described above the first location is provided at or close to the top of the well structure 100 (e.g. near the wellhead 120), while the second location is provided down into the well, it will nevertheless be appreciated that the system may be configured to communicate signals from the downhole device 150 at a first location to surface, e.g. the second location. In doing so, the downhole device 150 may be configured to modify the effective impedance of the well structure 100 such that any signal circulating to ground, via the well structure 100, will be modified in a similar manner. In such a way, that modified signal may be apparent at surface, e.g. at the second location.

FIG. 1B shows an example of a downhole device comprising a signal detector 210 and signal controller 220 at the downhole device.

Further still, a skilled reader will appreciate that the system may be configured to communicate information from surface to downhole, and also downhole to surface, by selectively modifying the existing signal being communicated in the well structure—in this example, that signal being a power signal, which here comprises a plurality of frequency components or harmonics associated with power generation and usage.

Separately, a skilled reader will appreciate that while in the above described examples a signal has been opportunistically used for the purposes of information between locations in a well structure; it will be appreciated that that signal may additionally or alternatively be able to provide sufficient power to charge a cell at the second location. For example, the downhole device may be configured to receive, from the well structure, a power signal that derives from the signal on the effective earth. While the power from that signal may not be significant, it nevertheless may be sufficient to charge, or trickle charge, a storage device (e.g. battery). A skilled reader will readily be able to implement such an embodiment accordingly.

While functions described above have been described in relation to being performed at the signal detector 210 or the signal controller 220, it will be appreciated that in other examples, those functions may be performed by alternative devices while still implementing the concept. Further, while shown as discrete hardware units, it will be appreciate that some of the above functions may be performed partially or entirely on software, performed on virtualized hardware. A skilled reader will readily be able to implement the various alternatives accordingly.

The above described systems, devices and methods may improve the manner in which signals are communicated in a well structure 100, for example, so as to improve transmission, and/or to minimize power consumption.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the spirit and scope of the invention.

The invention claimed is:

1. A method of opportunistic communication in a well structure, the method comprising:
   identifying at a first location an existing signal propagating in a section of the well structure between the first location and a second location;
   wherein the existing signal is a noise signal that comprises a series of harmonics;
   modifying the existing signal by modifying characteristics of the series of harmonics to produce a modified signal that encodes information at the first location for opportunistic communication of the information to the second location; and
   receiving the modified signal at the second location, and decoding the modified signal as to retrieve the information.

2. The method according to claim 1, wherein the noise signal is generated in the well structure from an electric power source located at or near the well structure.

3. The method according to claim 2, wherein the electric power source comprises a power generator for supplying electric power at the well structure, and wherein the noise signal comprises characteristics associated with power generation.

4. The method according to claim 2, wherein the electric power source comprises a rectifier device for rectifying electrical power at the well structure.

5. The method according to claim 4, wherein the rectifier device is configured to rectify electric power for application of Impressed Current Cathodic Protection (ICCP) at the well structure.

6. The method according to claim 1 wherein the step of identifying includes identifying one or more particular harmonics within the series of harmonics for preferential modification and communication of the existing signal.

7. The method according to claim 1, wherein the step of modifying includes changing characteristics of a signal path for the existing signal in the well structure.

8. The method according to claim 7, wherein changing the characteristics includes changing an impedance of the signal path.

9. The method according to claim 8, wherein the step of modifying the existing signal comprises selectively varying, over time, the impedance of the signal path.

10. The method according to claim 1, wherein the modified signal received at the second location is used additionally to provide power to a device at that location.

11. The method according to claim 1, wherein the opportunistic communication of the information is used to control a downhole device.

12. The method of claim 1, further comprising using power in the modified signal at the second location.

13. The method according to claim 1, wherein the method comprises modifying the identified existing signal to improve signal transmission of power to the second location.

14. A system for opportunistic communication in a well structure, the system comprising:
   a signal detector configured to identify at a first location an existing signal propagating in a section of the well structure between the first location and a second location, wherein the existing signal is a noise signal that comprises a series of harmonics, and the signal detector is configured to detect the series of harmonics; and
   a signal controller configured, in response to the signal detector identifying the existing signal, to modify the existing signal by modifying the series of harmonics to produce a modified signal that encodes information at the first location for opportunistic communication of the information to the second location in the well structure, wherein the modified signal is configured for receipt and decoding at the second location to retrieve the information.

15. The system according to claim 14, further comprising a signal receiver, for provision at the second location at the well structure, the signal receiver configured to receive the modified signal and decode the modified signal for retrieval of the information.

16. The system according to claim 15, wherein the signal receiver is configured for use with a downhole device, and wherein receipt of the modified signal at the signal receiver is useable to control the downhole device.

17. The system according to claim 14, wherein the signal detector is configured to detect, as the existing signal, a noise signal generated in the well structure from an electrical power source located at or near the well structure.

18. The system according to claim 14, wherein the system is configured to change the characteristics of a signal path for the existing signal in the well structure.

* * * * *